United States Patent
Kong et al.

(10) Patent No.: US 10,963,736 B2
(45) Date of Patent: Mar. 30, 2021

(54) OBJECT RECOGNITION APPARATUS, OBJECT RECOGNITION SYSTEM, AND OBJECT RECOGNITION METHOD

(71) Applicant: HITACHI, LTD., Tokyo (JP)

(72) Inventors: Quan Kong, Tokyo (JP); Yuki Watanabe, Tokyo (JP); Naoto Akira, Tokyo (JP); Daisuke Matsubara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/604,226

(22) PCT Filed: Dec. 21, 2017

(86) PCT No.: PCT/JP2017/045975
§ 371 (c)(1),
(2) Date: Oct. 10, 2019

(87) PCT Pub. No.: WO2018/189962
PCT Pub. Date: Oct. 18, 2018

(65) Prior Publication Data
US 2020/0117948 A1 Apr. 16, 2020

(30) Foreign Application Priority Data
Apr. 12, 2017 (JP) .............................. JP2017-078937

(51) Int. Cl.
*G06K 9/62* (2006.01)
(52) U.S. Cl.
CPC ......... *G06K 9/6234* (2013.01); *G06K 9/6262* (2013.01)
(58) Field of Classification Search
CPC ........... G06K 2209/01; G06K 2209/05; G06K 9/00335; G06K 9/3241
See application file for complete search history.

(56) References Cited

U.S. PATENT DOCUMENTS 6,775,411 B2 * 8/2004 Sloan ................... G06K 9/3241
358/1.6
7,062,093 B2 * 6/2006 Steger ................... G06K 9/6203
382/216

(Continued)

FOREIGN PATENT DOCUMENTS

JP 2001-014465 A 1/2001
JP 2004-337291 A 12/2004

(Continued)

OTHER PUBLICATIONS

International Search Report, dated Feb. 27, 2018, which issued during the prosecution of International Application No. PCT/JP2017/045975, which corresponds to the present application.

*Primary Examiner* — Yosef Kassa
(74) *Attorney, Agent, or Firm* — Baker Botts L.L.P.

(57) ABSTRACT

Provided is technique of object recognition that can accurately recognize an object. An object recognition apparatus (i) generates property data that highlights a specific property based on target data, (ii) extracts a discrimination-use feature amount used for discrimination of each piece of the property data, (iii) calculates discrimination information used for discrimination of the property data, (iv) extracts a reliability feature amount used for estimation of reliability of the discrimination information calculated for each piece of the property data, (v) estimates the reliability of the discrimination information, (vi) generates synthesized information acquired by synthesizing the discrimination information calculated for each piece of the property data and the reliability calculated for each piece of the property data, and (vii) performs processing related to the object recognition.

15 Claims, 13 Drawing Sheets

(56) References Cited

U.S. PATENT DOCUMENTS

| | | | |
|---|---|---|---|
| 7,129,484 B2* | 10/2006 | Hwu | G01N 23/04 |
| | | | 250/307 |
| 8,116,547 B2* | 2/2012 | Olson | G16H 30/20 |
| | | | 382/128 |
| 8,402,490 B2* | 3/2013 | Hoffberg-Borghesani | ............. |
| | | | H04N 21/812 |
| | | | 725/46 |
| 8,432,290 B2* | 4/2013 | Ruan | B60P 7/0861 |
| | | | 340/668 |
| 8,462,199 B2* | 6/2013 | Givon | H04N 13/204 |
| | | | 348/49 |
| 2015/0154472 A1 | 6/2015 | Yano et al. | |

FOREIGN PATENT DOCUMENTS

| | | |
|---|---|---|
| JP | 2015-225410 A | 12/2015 |
| WO | WO 2012/147256 A1 | 11/2012 |

\* cited by examiner

[FIG. 1]
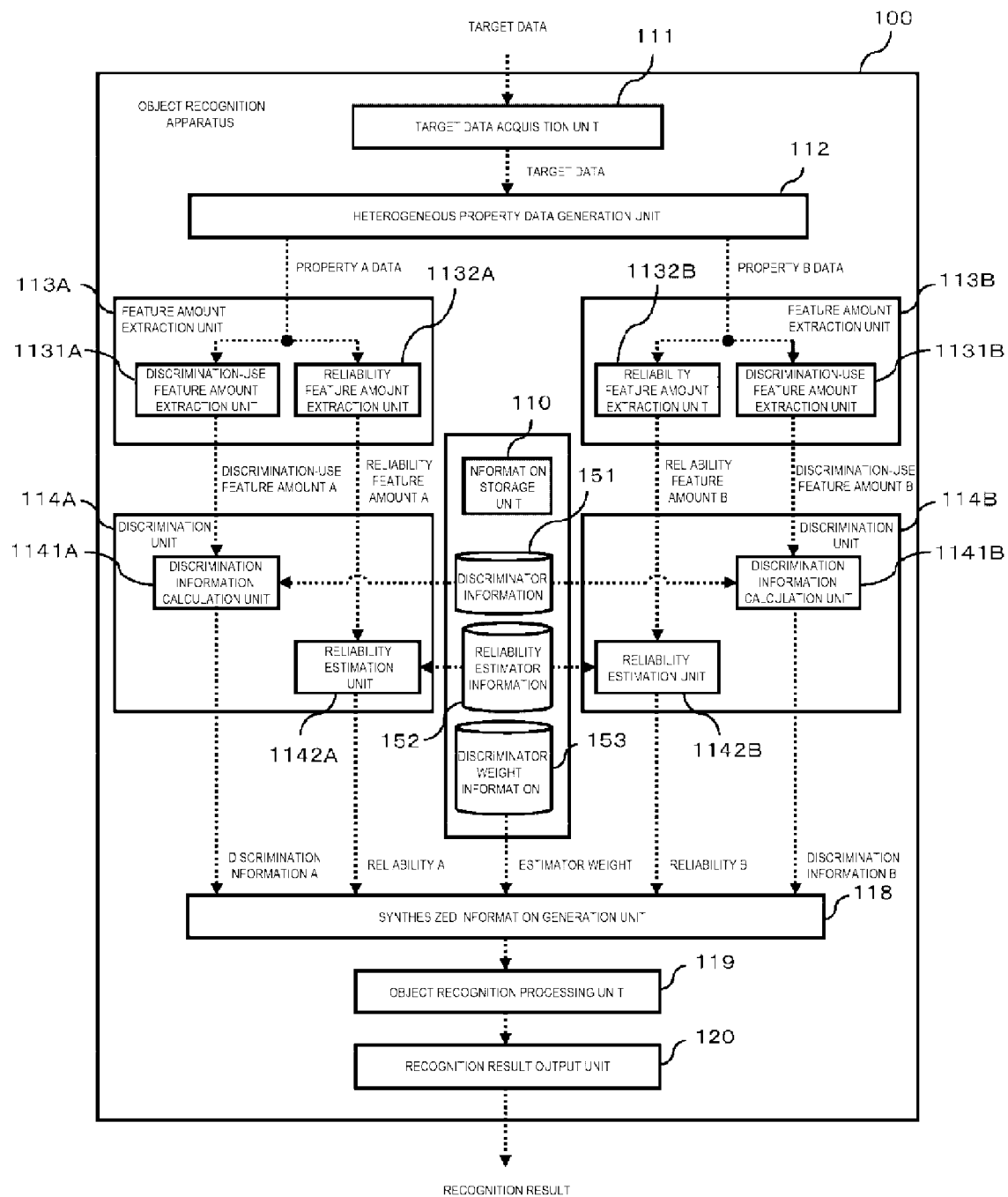

[FIG. 2]

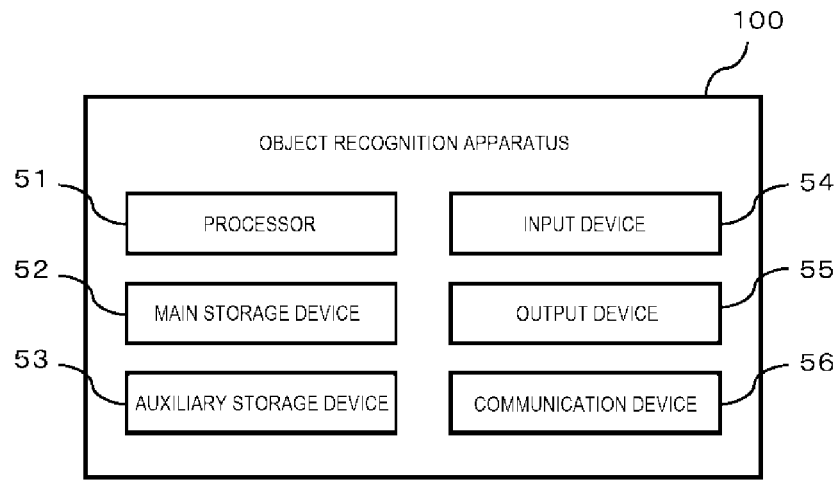

[FIG. 3]

DISCRIMINATOR INFORMATION 151

| PROPERTY ID (1511) | DISCRIMINATOR (1512) |
|---|---|
| A | DISCRIMINATION-USE EQUATION A |
| B | DISCRIMINATION-USE EQUATION B |
| : | : |

[FIG. 4]

RELIABILITY ESTIMATOR INFORMATION 152

| PROPERTY ID (1521) | CORRECT DISCRIMINATION RELIABILITY ESTIMATOR (1522) | INCORRECT DISCRIMINATION RELIABILITY ESTIMATOR (1523) | ESTIMATOR EVALUATION VALUE (1524) |
|---|---|---|---|
| A | CORRECT DISCRIMINATION LIKELIHOOD VALUE MAP A | INCORRECT DISCRIMINATION LIKELIHOOD VALUE MAP A | ESTIMATOR A EVALUATION VALUE va |
| B | CORRECT DISCRIMINATION LIKELIHOOD VALUE MAP B | INCORRECT DISCRIMINATION LIKELIHOOD VALUE MAP B | ESTIMATOR B EVALUATION VALUE vb |
| : | : | : | : |

[FIG. 5]
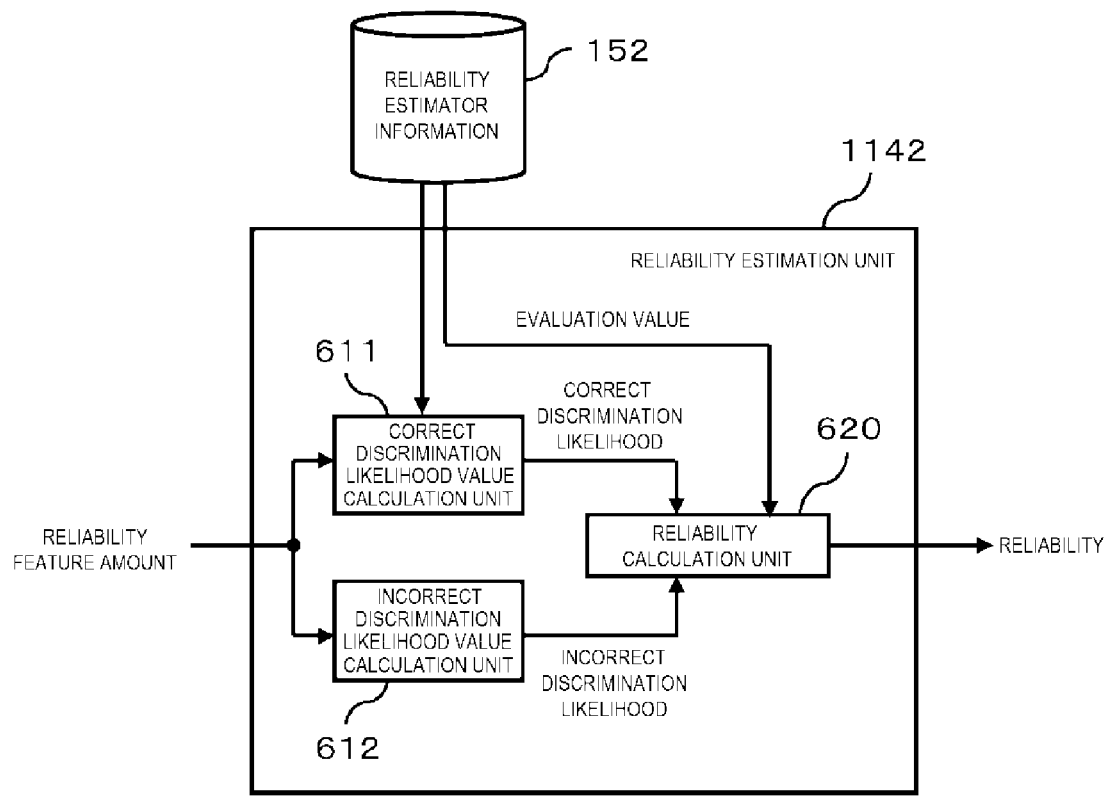
[FIG. 6]
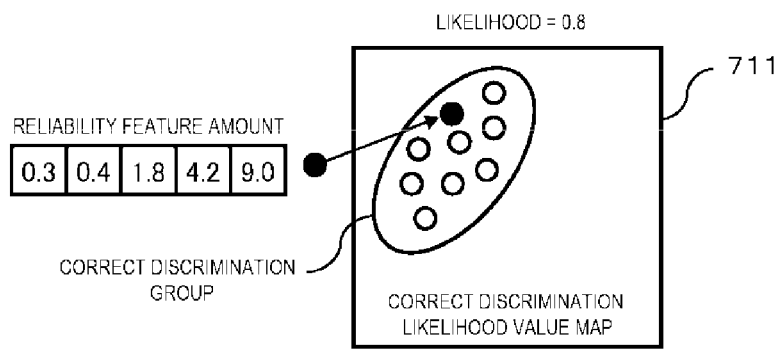

[FIG. 7]
PROCESSING CONCEPT OF
INCORRECT DISCRIMINATION LIKELIHOOD VALUE CALCULATION UNIT 612
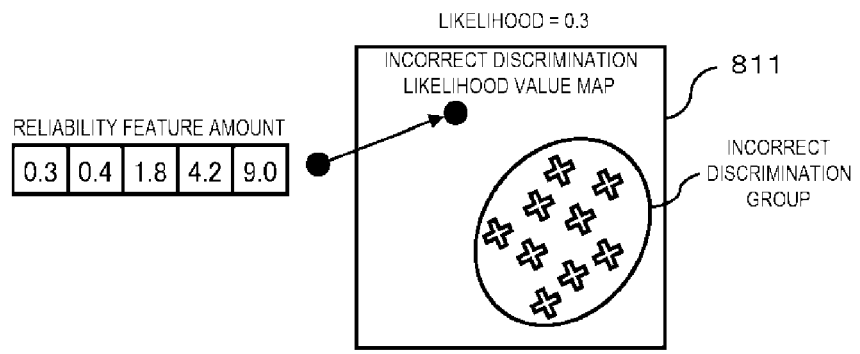
[FIG. 8]
DISCRIMINATOR WEIGHT INFORMATION 153
| PROPERTY ID (1531) | DISCRIMINATOR WEIGHT (1532) |
|---|---|
| A | DISCRIMINATOR A WEIGHT wa |
| B | DISCRIMINATOR B WEIGHT wb |
| : | : |

[FIG. 9]
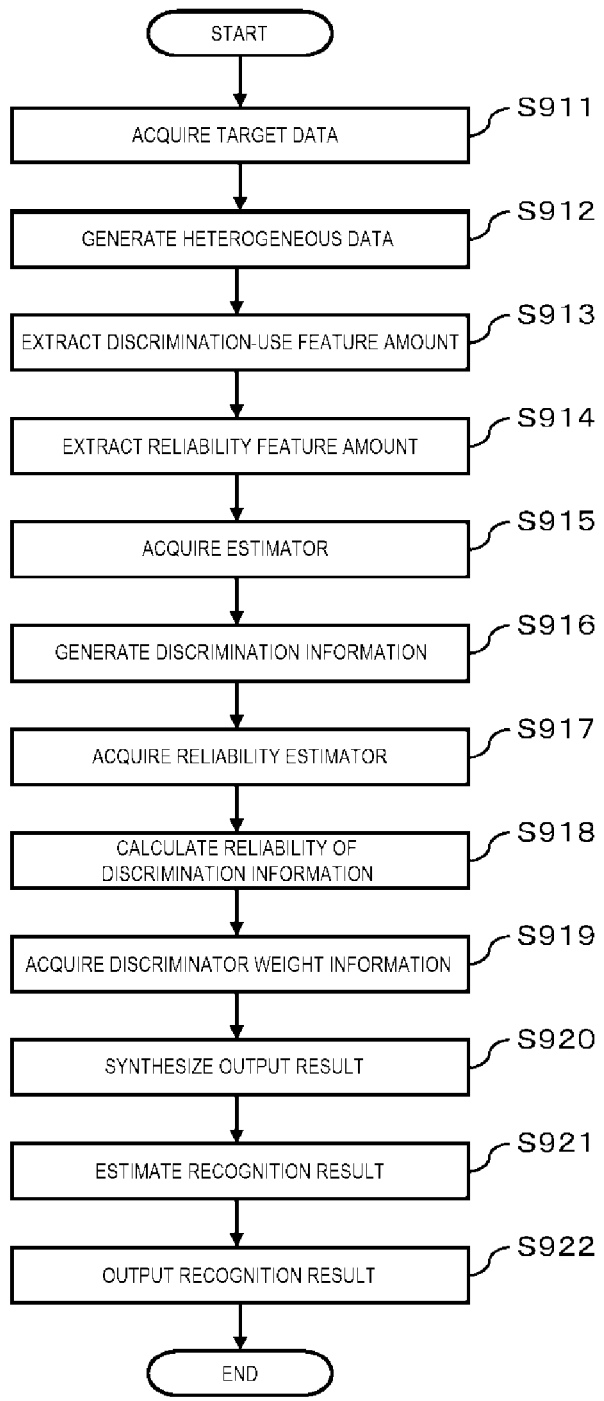

[FIG. 10]
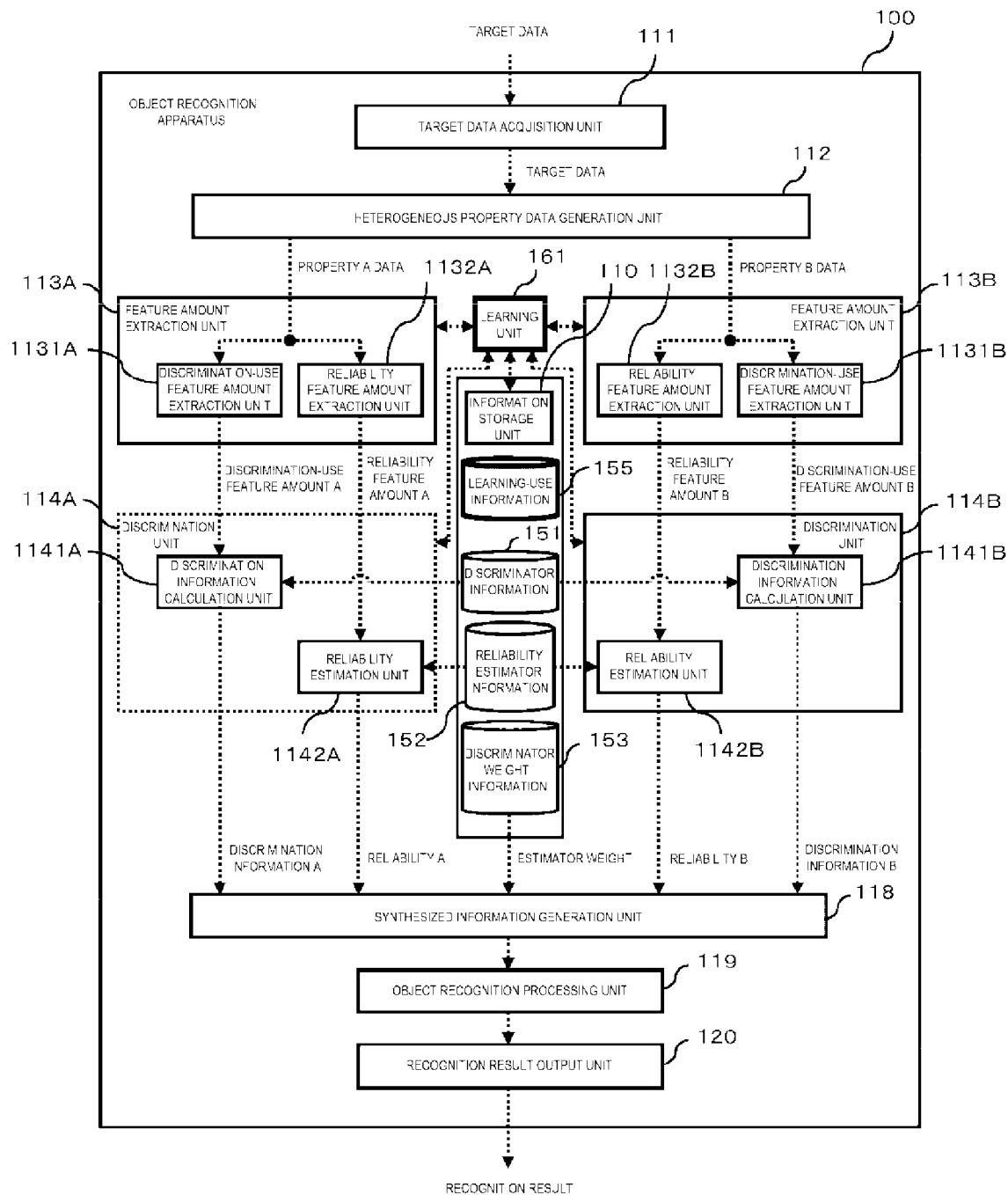

[FIG. 11]
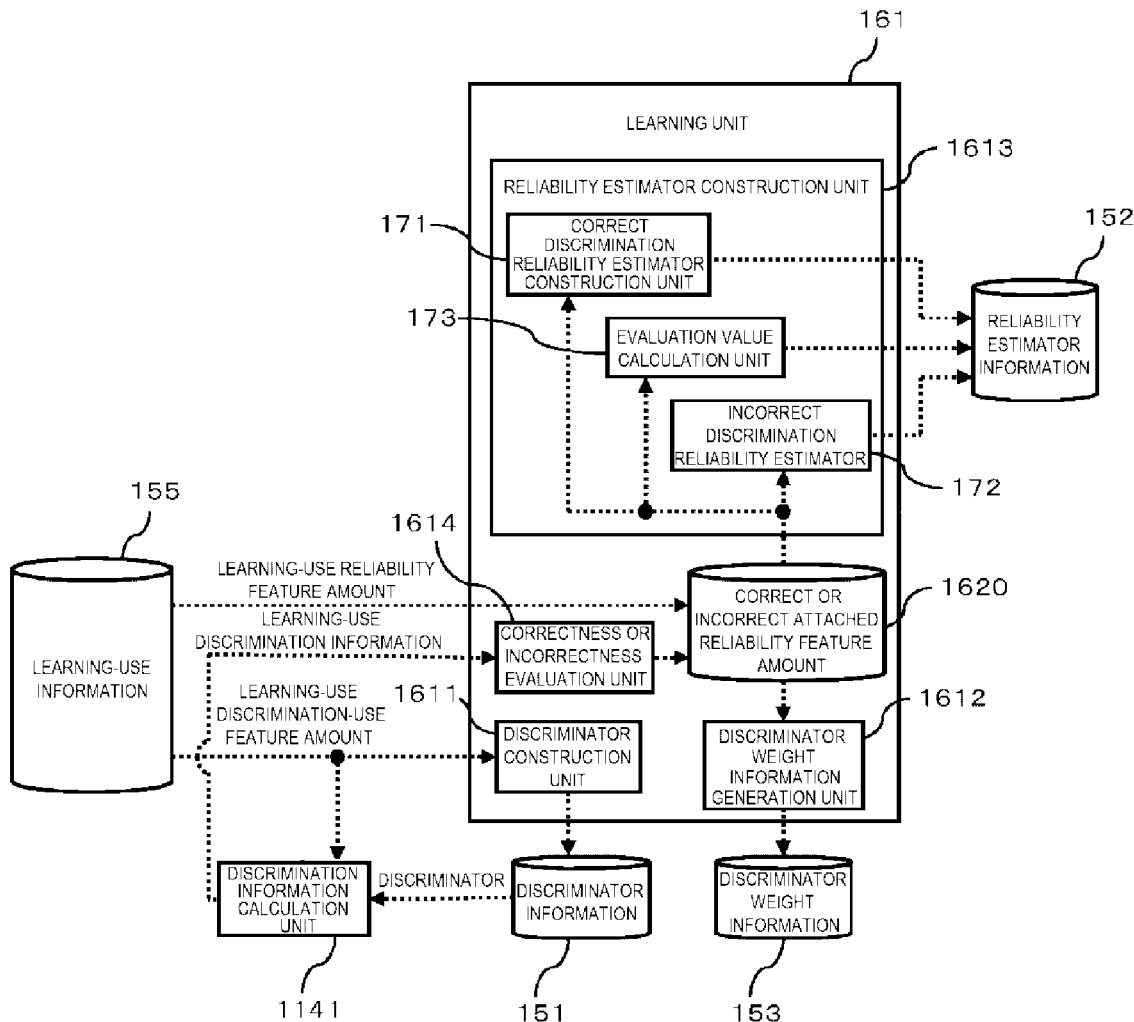
[FIG. 12]
LEARNING-USE INFORMATION 155
| LEARNING-USE DATA ID | PROPERTY ID | RELIABILITY FEATURE AMOUNT | DISCRIMINATION-USE FEATURE AMOUNT | CLASS ID |
|---|---|---|---|---|
| ##_0 | 0 | A1 | B1 | 1 |
| ##_0 | 1 | A2 | B2 | 1 |
| ##_1 | 0 | A3 | B3 | 2 |
| ##_1 | 1 | A4 | B4 | 2 |
| : | : | : | : | : |

[FIG. 13]

CORRECTNESS OR INCORRECTNESS
ATTACHED RELIABILITY FEATURE AMOUNT 1620

| PROPERTY ID (1621) | RELIABILITY FEATURE AMOUNT (1622) | CORRECTNESS OR INCORRECTNESS EVALUATION (1623) |
|---|---|---|
| 0 | A1 | CORRECT |
| 0 | A3 | INCORRECT |
| 1 | A2 | INCORRECT |
| 1 | A4 | CORRECT |
| ⋮ | ⋮ | ⋮ |

[FIG. 14]
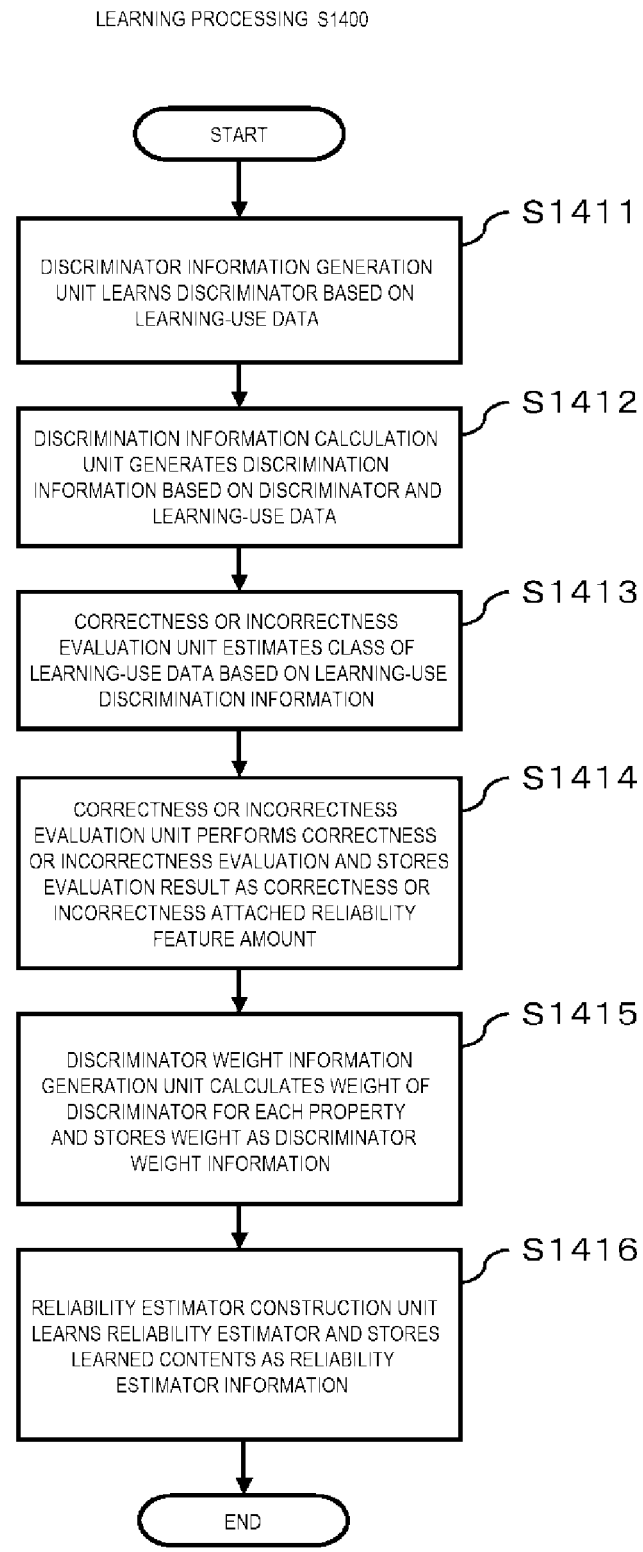

[FIG. 15]
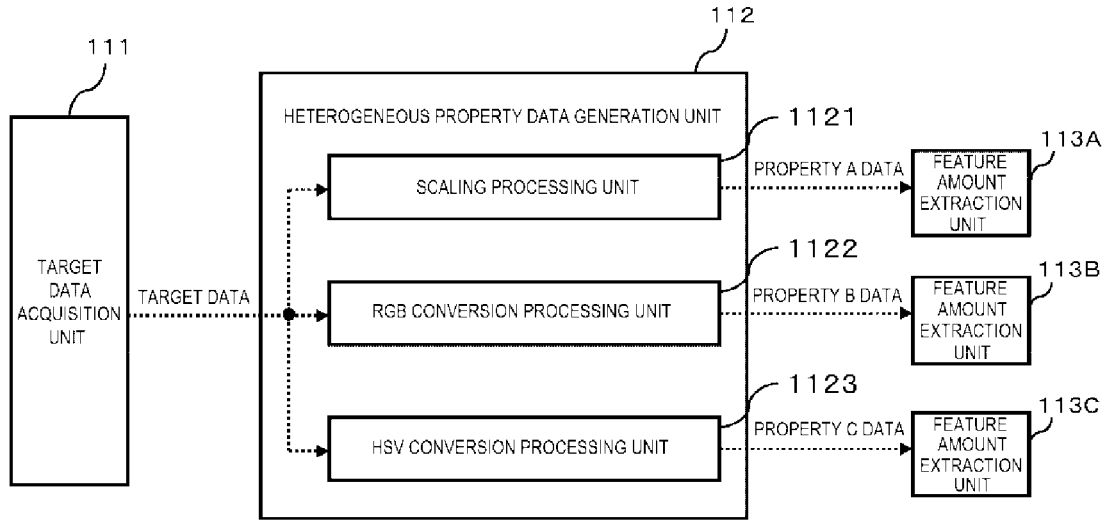
[FIG. 16]
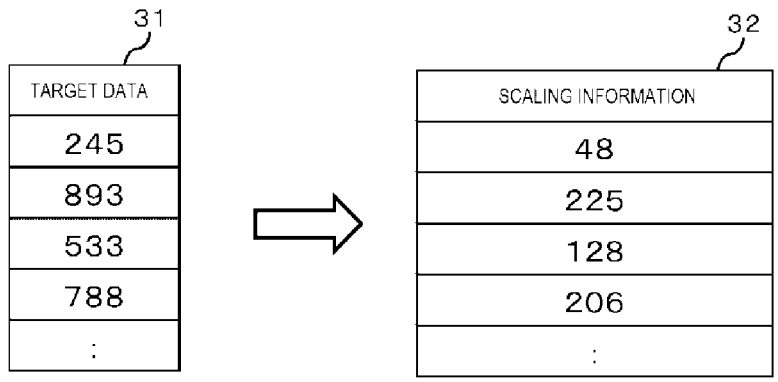
[FIG. 17]
RGB CONVERSION TABLE
| RAW DATA VALUE RANGE | RGB CONVERSION DESTINATION |
|---|---|
| 0~200 | (255, 0, 0) |
| 201~400 | (0, 255, 0) |
| 401~600 | (0, 0, 255) |
| 601~800 | (255, 255, 100) |
| : | : |
1700

[FIG. 18]
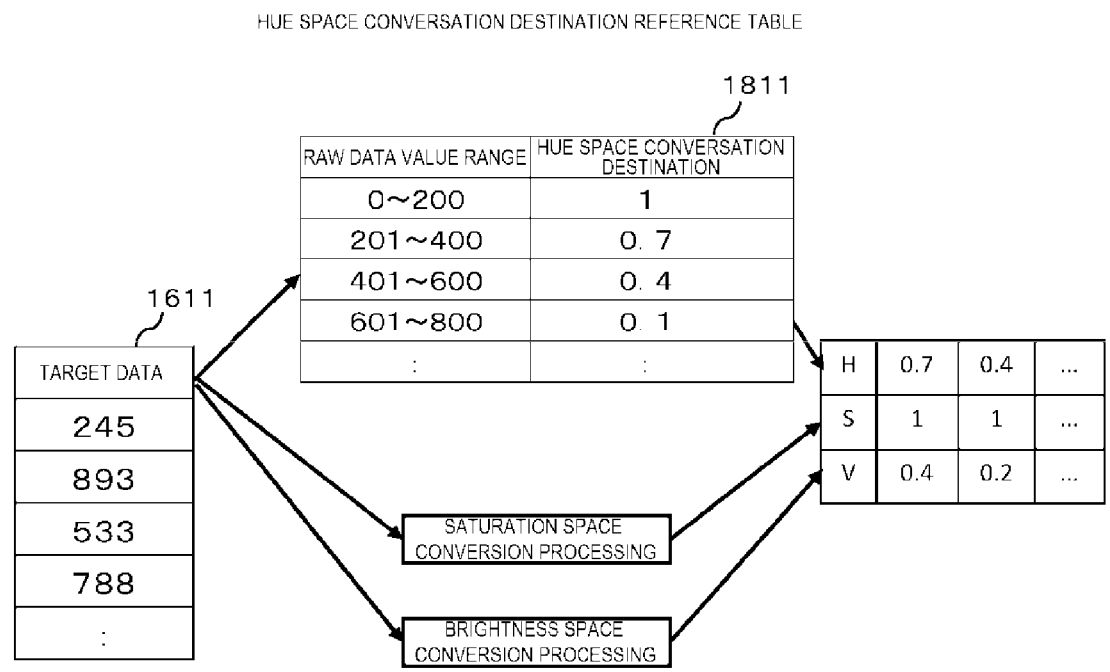

[FIG. 19]
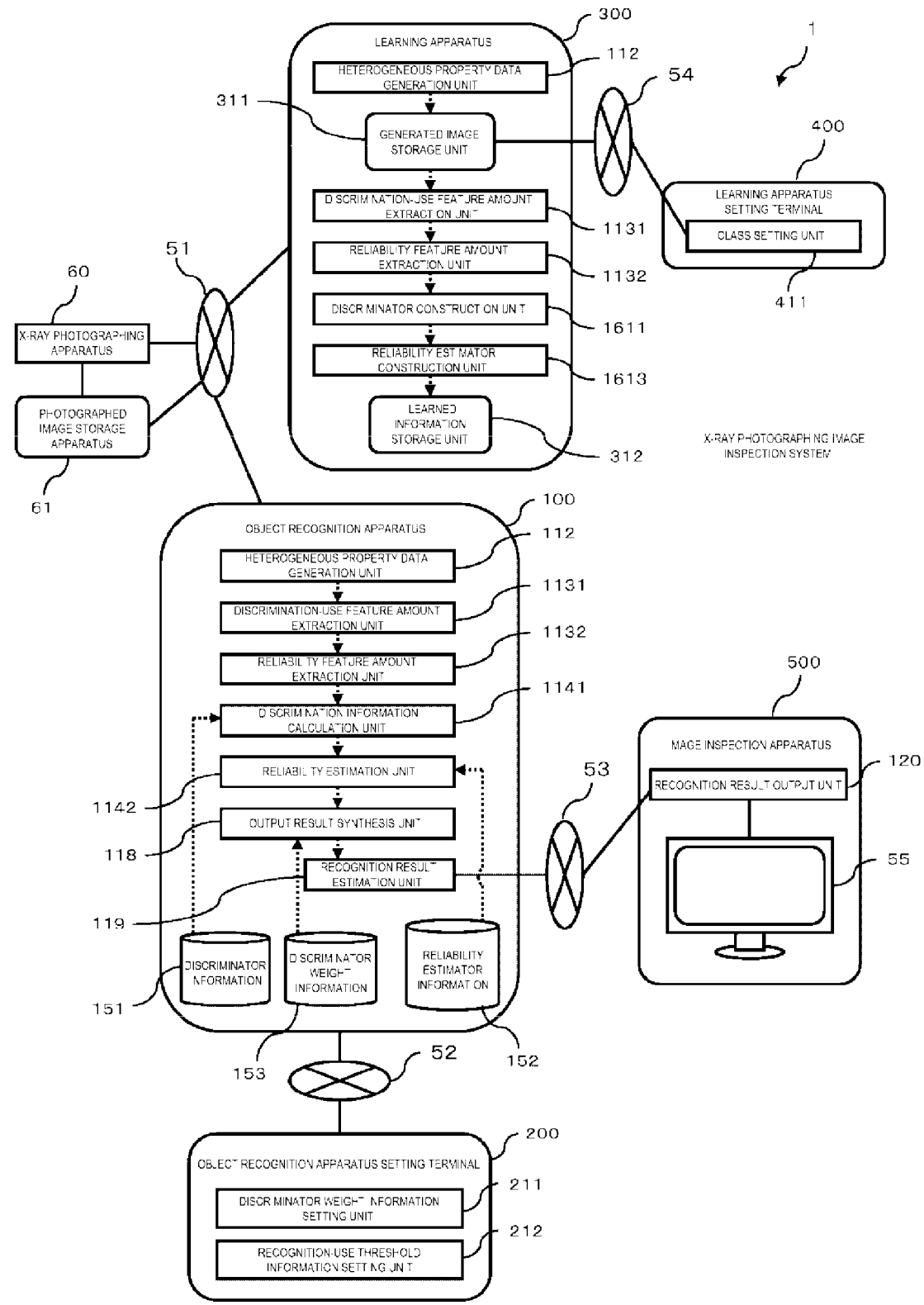

[FIG. 20]
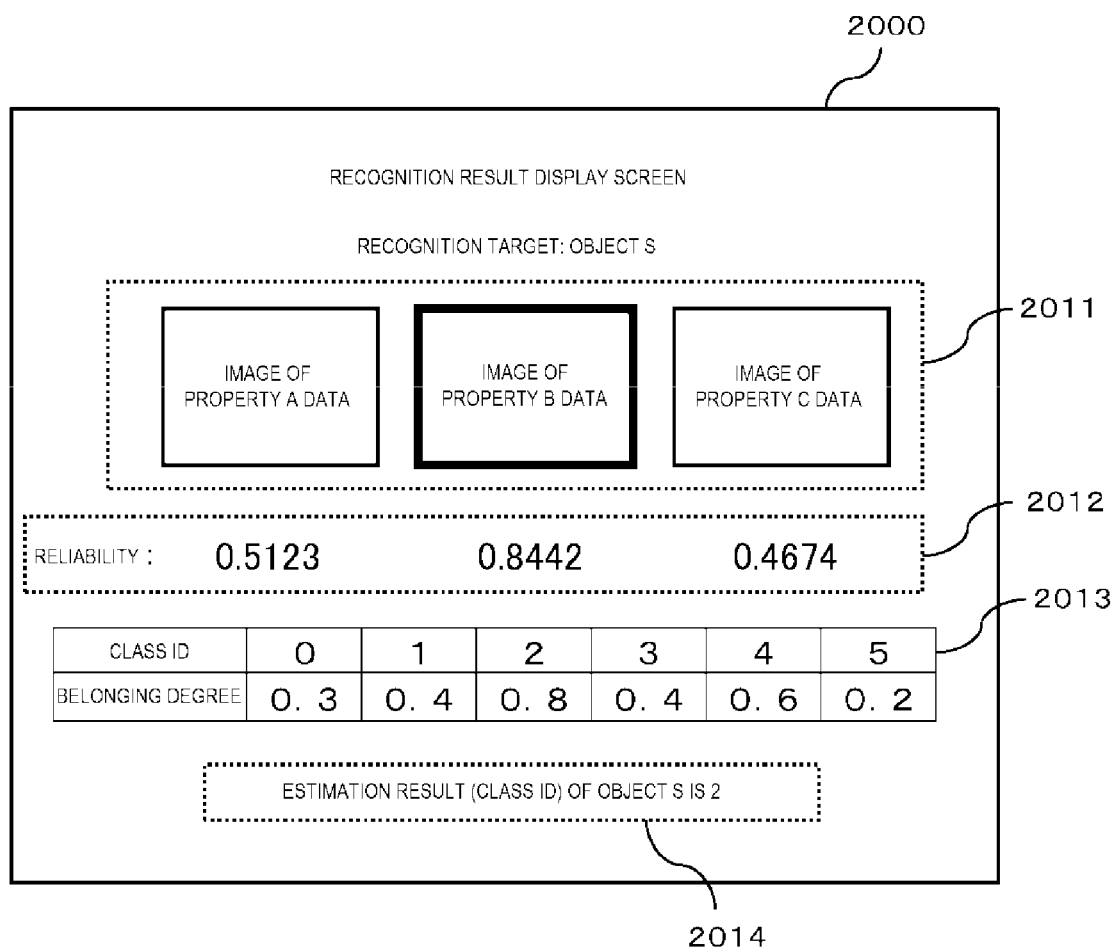

OBJECT RECOGNITION APPARATUS, OBJECT RECOGNITION SYSTEM, AND OBJECT RECOGNITION METHOD

CROSS REFERENCE TO PRIOR APPLICATIONS

This application is a U.S. National Phase application under 35 U.S.C. § 371 of International Application No. PCT/JP2017/045975, filed on Dec. 21, 2017, which claims benefit of priority to Japanese Patent Application No. 2017-078937, filed on Apr. 12, 2017. The International Application was published in Japanese on Oct. 18, 2018 as WO 2018/189962 A1 under PCT Article 21(2). The contents of the above applications are hereby incorporated by reference.

TECHNICAL FIELD

The present invention relates to an object recognition apparatus, an object recognition system, and an object recognition method.

BACKGROUND ART

PTL 1 discloses that "one or more pieces of information having different properties are input in advance from the entire or one or more parts of many objects, integrated information acquired by integration of the one or more pieces of information is classified on a class basis, and a feature extraction matrix calculated from the integrated information classified on a class basis and a representative feature amount from the feature extraction matrix are calculated; information having different properties is input from the entire or one or more parts of an input object, the information having different properties is integrated, a feature amount is calculated using the integrated information and the feature extraction matrix, and one or more recognition results having a highest similarity between the representative feature amount and the feature amount of the input object are output."

PRIOR ART LITERATURE

Patent Literature

PTL 1: JP-A-2001-14465

SUMMARY OF INVENTION

Technical Problem

In PTL 1, the information having properties different from the entire or one or more parts of the input object is input and integrated, the feature amount is calculated using the integrated information and the feature extraction matrix, and the one or more recognition results having the highest similarity between the representative feature amount and the feature amount of the input object are output.

However, in such a method of integrating a plurality of pieces of information into one piece of information and integrally expressing a plurality of properties of the object based on the feature amount calculated from the integrated information, a feature amount advantageous for the recognition is averaged, and information in the integrated information that is disadvantageous for the recognition is also learned. Therefore, improvement in recognition accuracy reaches a ceiling.

The invention is made in view of such a background, and an object thereof is to provide an object recognition apparatus, an object recognition system, and an object recognition method that can accurately recognize an object.

Solution to Problem

An aspect of the invention provides an object recognition apparatus. The object recognition apparatus includes: a heterogeneous property data generation unit that generates, for a plurality of different properties, property data which highlights a specific property based on target data acquired for an object; a discrimination-use feature amount extraction unit that extracts, for each piece of the property data, a discrimination-use feature amount used for discrimination of each piece of the property data; a discrimination information calculation unit that calculates, for each piece of the property data, discrimination information used for discrimination of the property data based on the discrimination-use feature amount calculated for each piece of the property data; a reliability feature amount extraction unit that extracts, for each piece of the property data, a reliability feature amount used for estimation of reliability of the discrimination information calculated for each piece of the property data; a reliability estimation unit that estimates, for each piece of the property data, the reliability of the discrimination information based on the reliability feature amount calculated for each piece of the property data; a synthesized information generation unit that generates synthesized information acquired by synthesizing the discrimination information calculated for each piece of the property data and the reliability calculated for each piece of the property data; and an object recognition processing unit that performs processing related to recognition of the object based on the synthesized information and generates a recognition result.

Other problems disclosed by the invention and methods for solving such problems will become apparent from descriptions of embodiments with reference to the accompanying drawings.

Advantageous Effect

According to the invention, an object can be recognized accurately.

BRIEF DESCRIPTION OF DRAWINGS

FIG. 1 is a functional block diagram of an object recognition apparatus according to a first embodiment.

FIG. 2 shows an example of hardware that complements the object recognition apparatus.

FIG. 3 shows an example of discriminator information.

FIG. 4 shows an example of reliability estimator information.

FIG. 5 is a functional block diagram of a reliability estimation unit.

FIG. 6 shows an example of processing performed during calculation of a correct discrimination likelihood value.

FIG. 7 shows an example of processing performed during calculation of an incorrect discrimination likelihood value.

FIG. 8 shows an example of discriminator weight information.

FIG. 9 is a flowchart showing object recognition processing.

FIG. 10 is a functional block diagram of the object recognition apparatus according to the first embodiment.

FIG. 11 is a functional block diagram related to a learning unit.

FIG. 12 shows an example of learning-use information.

FIG. 13 shows an example of a correctness or incorrectness attached reliability feature amount.

FIG. 14 is a flowchart showing learning processing.

FIG. 15 is a functional block diagram related to a heterogeneous property data generation unit of an object recognition apparatus according to a third embodiment.

FIG. 16 shows an example of scaling information.

FIG. 17 shows an example of an RGB conversion table.

FIG. 18 shows conversion by an HSV conversion processing unit.

FIG. 19 is a functional block diagram of an object recognition system.

FIG. 20 shows an example of a recognition result display screen.

DESCRIPTION OF EMBODIMENTS

Hereinafter, embodiments will be described with reference to the accompanying drawings. In the following description, the same or similar components are denoted by the same reference numerals, and a repetitive description thereof may be omitted.

First Embodiment

FIG. 1 is a functional block diagram of an object recognition apparatus 100 to be described as the first embodiment. The object recognition apparatus 100 performs processing related to recognition of an object based on data (hereinafter, referred to as target data) acquired for the object such as video data acquired by photographing the object. More specifically, the object recognition apparatus 100 generates, for a plurality of different properties, data (hereinafter, referred to as property data) that highlights a specific property (an attribute) based on the target data. For each piece of the generated property data, a feature amount (hereinafter, referred to as a discrimination-use feature amount) used for discrimination of the object and a feature amount (hereinafter, referred to as a reliability feature amount) used for estimation of reliability when the object is discriminated based on the discrimination-use feature amount are extracted. Then, the object recognition apparatus 100 performs processing related to the recognition of the object based on the discrimination-use feature amount and the reliability feature amount that are extracted for each piece of the property data.

FIG. 2 shows an example of hardware (information processing apparatus) that complements the object recognition apparatus 100. The object recognition apparatus 100 includes a processor 51, a main storage device 52, an auxiliary storage device 53, an input device 54, an output device 55, and a communication device 56. These are communicably connected to each other via a communication unit such as a bus. It should be noted that the entire or a part of the object recognition apparatus 100 may be complemented using, for example, virtual resources such as a cloud server in a cloud system.

The processor 51 includes, for example, a Central Processing Unit (CPU), a Micro Processing Unit (MPU), a Graphics Processing Unit (GPU), and a Digital Signal Processor (DSP). The processor 51 complements all or a part of functions of the object recognition apparatus 100 by reading and executing a program stored in the main storage device 52. The main storage device 52 is, for example, a Read Only Memory (ROM), a Random Access Memory (RAM), or a Non-Volatile Semiconductor Memory (Non Volatile RAM (NVRAM)), and stores a program and data.

The auxiliary storage device 53 is, for example, a read and write device of a recording medium such as a hard disk drive, a Solid State Drive (SSD), an optical storage device (Compact Disc (CD), a Digital Versatile Disc (DVD), or the like), a storage system, an IC card, an SD memory card, or an optical recording medium. A program and data stored in the auxiliary storage device 53 are loaded into the main storage device 52 at any time. The auxiliary storage device 53 may be independent of the object recognition apparatus 100 such as a network storage.

The input device 54 is an interface that receives input of data from outside, for example, a reading device of a recording medium (a nonvolatile memory, an optical recording medium, a magnetic recording medium, a magneto-optical recording medium, or the like), a keyboard, a mouse, or a touch panel. It should be noted that, for example, the object recognition apparatus 100 may receive the input of data from another device via the communication device 56.

The output device 55 is a user interface that provides data or information such as processing progress or a processing result to the outside, for example, a screen display device (a Liquid Crystal Display, a projector, a graphic card, or the like), a printing device, or a recording device of a recording medium. It should be noted that, for example, the object recognition apparatus 100 may provide data such as the processing progress or a processing result to another device via the communication device 56.

The communication device 56 is a wired or wireless communication interface that complements communication between another device such as an image acquisition device 2 and an element, for example, a Network Interface Card (NIC), or a wireless communication module.

As shown in FIG. 1, the object recognition apparatus 100 includes an information storage unit 110, a target data acquisition unit 111, a heterogeneous property data generation unit 112, feature amount extraction units 113A and 113B, discrimination units 114A and 114B, a synthesized information generation unit 118, an object recognition processing unit 119, and a recognition result output unit 120. The feature amount extraction unit 113 includes a discrimination-use feature amount extraction unit 1131 and a reliability feature amount extraction unit 1132. The discrimination unit 114 includes a discrimination information calculation unit 1141 and a reliability estimation unit 1142. In the following description, suffixes (alphabet parts) of reference numerals attached to names of components may be omitted to collectively refer to the components (for example, the "feature amount extraction unit 113A" and the "feature amount extraction unit 113B" are collectively referred to as the "feature amount extraction unit 113").

The functions described above are complemented by, for example, reading and executing the programs stored in the main storage device 52 and the auxiliary storage device 53 by the processor 51. These functions are complemented by, for example, hardware (Field-Programmable Gate Array (FPGA), Application Specific Integrated Circuit (ASIC), or the like) included in the object recognition apparatus 100. In addition to these functions, the object recognition apparatus 100 may have functions of, for example, an operating system, a device driver, or a DataBase Management System (DBMS).

Among the functions shown in FIG. 1, the information storage unit 110 stores discriminator information 151, reliability estimator information 152, and discriminator weight information 153. The information storage unit 110 manages these pieces of information by, for example, a file system or the DBMS.

The discriminator information 151 includes information on a discriminator prepared for each type of property data (hereinafter, also referred to as discriminator information). The reliability estimator information 152 includes information on a reliability estimator prepared for each type of the property data (hereinafter, also referred to as reliability estimator information). The discriminator weight information 153 includes information on a weight of a discriminator (hereinafter, also referred to as discriminator weight information). Details of the discriminator, the reliability estimator, and the discriminator weight information will be described below. The information stored in the information storage unit 110 is set, for example, via the input device 54 and the communication device 56.

The target data acquisition unit 111 acquires target data from the outside via the input device 54 and the communication device 56. The target data is data (image data, RAW data, or the like) acquired with, for example, a visible camera, a stereo camera, an IR (infrared) camera, or a radiation (X-ray) photographing apparatus.

The heterogeneous property data generation unit 112 generates, for a plurality of different properties, property data that highlights a specific property based on the target data input from the outside. For example, when the target data is image data in a Red Green Blue (RGB) format, the heterogeneous property data generation unit 112 generates data acquired by extracting a red (R) component from the target data, data acquired by extracting a green (G) component from the target data, and data acquired by extracting a blue (B) component from the target data as the property data. The heterogeneous property data generation unit 112 inputs the generated property data into a pair of the feature amount extraction unit 113 and a pair of the discrimination unit 114, respectively. In the present embodiment, for the sake of simplicity, the heterogeneous property data generation unit 112 generates two types of the property data (hereinafter, referred to as property A data and property B data) as an example, and inputs the property A data to the feature amount extraction unit 113A and inputs the property B data to the feature amount extraction unit 113B, respectively.

The discrimination-use feature amount extraction unit 1131 of the feature amount extraction unit 113 extracts from the property data a discrimination-use feature amount used for discrimination of each piece of the property data, and inputs the extracted discrimination-use feature amount to the discrimination information calculation unit 1141 of the discrimination unit 114. The discrimination-use feature amount includes, for example, information used for identification of a shape of the target data. The discrimination-use feature amount extraction unit 1131 extracts, for example, vector information that is robust with respect to a change in a feature of the target data as the discrimination-use feature amount. The method for extracting the discrimination-use feature amount is not necessarily limited, for example, the discrimination-use feature amount extraction unit 1131 extracts the discrimination-use feature amount from the property data by a method described in the following Reference 1.

Bag of contour fragments for robust shape classification X Wang, B Feng, X Bai, W Liu, L J Latecki, Pattern Recognition 47 (6), 2116-2125 (Reference 1).

The reliability feature amount extraction unit 1132 of the feature amount extraction unit 113 extracts a reliability feature amount and inputs the extracted reliability feature amount to the reliability estimation unit 1142 of the discrimination unit 114. The reliability feature amount is used for estimation of reliability of discrimination information to be described below that is calculated by the discrimination information calculation unit 1141 for each piece of the property data. The reliability feature amount is extracted from a viewpoint different from the discrimination-use feature amount, and is, for example, vector information indicating context information on the target data (for example, vector information acquired by expressing a frequency of appearance of color information included in the target data in a form of a histogram).

The discrimination information calculation unit 1141 of the discrimination unit 114 acquires discrimination information, which is used for discrimination of the property data, based on the discrimination-use feature amount input from the discrimination-use feature amount extraction unit 1131 and a discriminator that is acquired from the discriminator information 151 and is prepared for each piece of the property data. The discriminator is configured with, for example, a Support Vector Machine (SVM). The discrimination information calculation unit 1141, for example, generates discrimination information in a vector format and inputs the discrimination information generated in the vector format to the synthesized information generation unit 118. The discrimination information in the vector format includes, for example, information such as an identifier (hereinafter, also referred to as a class ID) indicating a class to which the target data belongs and a probability indicating a belonging degree of the target data to the class.

FIG. 3 shows an example of the discriminator information 151. The discriminator information 151 includes one or more records each including items of a property ID 1511 and a discriminator 1512. An identifier (hereinafter, referred to as property ID) assigned to each type (a property) of the property data is set in the property ID 1511. Configuration information on a discriminator (for example, an equation representing the discriminator) is set in the discriminator 1512.

Referring back to FIG. 1, the reliability estimation unit 1142 estimates reliability of the discrimination information output by the discrimination information calculation unit 1141 based on the reliability feature amount input from the reliability feature amount extraction unit 1132 and the reliability estimator information of the property data acquired from the reliability estimator information 152, and inputs the estimated reliability to the synthesized information generation unit 118.

FIG. 4 shows an example of the reliability estimator information 152. As shown in the same drawing, the reliability estimator information 152 includes one or more records each including items of a property ID 1521, a correct discrimination reliability estimator 1522, an incorrect discrimination reliability estimator 1523, and a discriminator evaluation value 1524.

Among the above items, the property ID described above is set in the property ID 1521. Information (in this example, a correct discrimination likelihood value map to be described below) that constitutes a reliability estimator (hereinafter, referred to as a correct discrimination reliability estimator) is set in the correct discrimination reliability estimator 1522. Information (in this example, an incorrect discrimination likelihood value map to be described below) that constitutes a reliability estimator (hereinafter, referred to as an incorrect discrimination reliability estimator) is set in the incorrect discrimination reliability estimator 1523. An evaluation value of a discriminator (for example, a prior probability of a reliability of the discriminator) is set in the discriminator evaluation value 1524.

FIG. 5 is a functional block diagram showing details of the reliability estimation unit 1142. As shown in the same drawing, the reliability estimation unit 1142 has functions of a correct discrimination likelihood calculation unit 611, an incorrect discrimination likelihood value calculation unit 612, and a reliability calculation unit 620.

The correct discrimination likelihood calculation unit 611 calculates likelihood (hereinafter, referred to as a correct discrimination likelihood value) based on the reliability feature amount input from the reliability feature amount extraction unit 1132 and the correct discrimination reliability estimator (the correct discrimination likelihood value map) acquired from the reliability estimator information 152, and inputs the calculated correct discrimination likelihood value to the reliability calculation unit 620. Details of the correct discrimination likelihood value will be described below.

The incorrect discrimination likelihood value calculation unit 612 calculates likelihood (hereinafter, referred to as an incorrect discrimination likelihood value) based on the reliability feature amount input from the reliability feature amount extraction unit 1132 and the incorrect discrimination reliability estimator (the incorrect discrimination likelihood value map) acquired from the reliability estimator information 152, and inputs the calculated incorrect discrimination likelihood value to the reliability calculation unit 620. Details of the incorrect discrimination likelihood value will be described below.

The reliability calculation unit 620 calculates the reliability of the discrimination information output by the discrimination information calculation unit 1141 provided for the same property data based on the evaluation value of the discriminator acquired from the reliability estimator information 152, the correct discrimination likelihood value input from the correct discrimination likelihood calculation unit 611, and the incorrect discrimination likelihood value input from the incorrect discrimination likelihood value calculation unit 612. The evaluation value of the reliability estimator information 152, for example, may be set in advance by a user, or may be automatically generated by a method such as machine learning by using information such as a result of discrimination performed in the past.

FIG. 6 is a schematic diagram showing an example of processing performed by the correct discrimination likelihood calculation unit 611 when the correct discrimination likelihood value is calculated based on the reliability feature amount input from the reliability feature amount extraction unit 1132. As shown in the same drawing, the correct discrimination likelihood value calculation unit 611 stores a correct discrimination likelihood value map 711. The correct discrimination likelihood value map 711 includes information in which likelihood corresponding to a reliability feature amount is associated with coordinates of a two-dimensional space. The correct discrimination likelihood value calculation unit 611 outputs a correct discrimination likelihood value set to the coordinates corresponding to the reliability feature amount. The correct discrimination likelihood value map 711 is set to have a higher likelihood value in a region where the discrimination of the property data is likely to be correct.

FIG. 7 is a schematic diagram showing an example of processing performed by the incorrect discrimination likelihood value calculation unit 612 when the incorrect discrimination likelihood value is calculated based on the reliability feature amount input from the reliability feature amount extraction unit 1132. As shown in the same drawing, the incorrect discrimination likelihood value calculation unit 612 stores an incorrect discrimination likelihood value map 811. The incorrect discrimination likelihood value map 811 includes information in which likelihood corresponding to a reliability feature amount is associated with coordinates of a two-dimensional space. The incorrect discrimination likelihood value calculation unit 612 outputs an incorrect discrimination likelihood value set to the coordinates corresponding to the input reliability feature amount. The incorrect discrimination likelihood value map 811 is set to have a higher likelihood value in a region where the discrimination of the property data is likely to be incorrect.

Modes of the correct discrimination likelihood value map 711 and the incorrect discrimination likelihood value map 811 are not necessarily limited. The correct discrimination likelihood value map 711 and the incorrect discrimination likelihood value map 811 may be, for example, manually designated based on experience or the like by the user, or automatically generated by a method such as machine learning based on an evaluation result that whether the discrimination is likely to be correct by practically using data.

Returning to FIG. 5, the reliability calculation unit 620 acquires a value by dividing the correct discrimination likelihood value output by the correct discrimination likelihood value calculation unit 611 by a sum of the correct discrimination likelihood value output from the correct discrimination likelihood value calculation unit 611 and the incorrect discrimination likelihood value output from the incorrect discrimination likelihood value calculation unit, acquires a value by multiplying the value acquired by dividing in the above manner by the evaluation value acquired from the reliability estimator information 152, and inputs the value acquired by multiplying in the above manner to the synthesized information generation unit 118 as the reliability. For example, the reliability calculation unit 620 calculates reliability $r_n$ described above from the following equation. Here, n represents a type of the property.

$$r_n = p(O^n=1|C_n) = \frac{p(C_n|O^n=1)p(O^n=1)}{p(C_n|O^n=1)p(O^n=1)+p(C_n|O^n=-1)p(O^n=-1)}$$

In the above equation, $C_n$ is a reliability feature amount extracted from the reliability feature amount extraction unit 1132, $p(C_n|O^n=1)$ is the correct discrimination likelihood value calculated by the correct discrimination likelihood value calculation unit 611, $p(C_n|O^n=-1)$ is the incorrect discrimination likelihood value calculated by the incorrect discrimination likelihood calculation unit 612, $p(O^n=1)$ is an evaluation value of a discriminator (a prior probability of reliability that outputs a correct answer) acquired from the reliability estimator information 152, and $p(o^n=-1)$ is an evaluation value of a discriminator (a prior probability of reliability that outputs an incorrect answer) acquired from the reliability estimator information 152.

Returning to FIG. 1, the synthesized information generation unit 118 generates synthesized vector information (synthesized information) acquired by synthesizing discrimination information h in the vector format that is input from the discrimination unit 114, reliability r, and a weight α of a discriminator acquired from the discriminator weight information 153, and inputs the generated synthesized vector information to the object recognition processing unit 119.

The weight α of the discriminator is set, for example, manually or based on past information. When the type of the property data is N, the synthesized vector information is represented by, for example, the following equation.

$$\sum_{n=1}^{N} \alpha_n r_n h_n \quad \text{(Equation 1)}$$

FIG. 8 shows an example of the discriminator weight information 153. As shown in the same drawing, the discriminator weight information 153 includes one or more records each including items of a property ID 1531 and a discriminator weight 1532. The property ID described above is set in the property ID 1531. Information indicating a weight of a discriminator is set in the discriminator weight 1532.

Returning to FIG. 1, the object recognition processing unit 119 estimates a class to which an object (the target data) belongs based on the synthesized vector information input from the synthesized information generation unit 118 and outputs an estimation result. For example, the object recognition processing unit 119 outputs an index value of a vector element having a largest value in the synthesized vector information as the estimation result.

The recognition result output unit 120, for example, outputs information (for example, recognized class information) indicating the result estimated by the object recognition processing unit 119 to the output device 55.

FIG. 9 is a flowchart showing processing (hereinafter, referred to as object recognition processing S900) performed by the object recognition apparatus 100 having the above-described configuration. Hereinafter, the object recognition processing S900 will be described with FIG. 9.

First, the target data acquisition unit 111 acquires target data from outside via the input device 54 and the communication device 56 (S911). Subsequently, the heterogeneous property data generation unit 112 generates a plurality of types of property data based on the target data and inputs each piece of the generated data to the corresponding feature amount extraction unit 113 (S912).

Subsequently, the discrimination-use feature amount extraction unit 1131 extracts a discrimination-use feature amount from the property data and inputs the discrimination-use feature amount to the discrimination unit 114 (S913). The reliability feature amount extraction unit 1132 extracts a reliability feature amount from the property data and inputs the extracted reliability feature amount to the discrimination unit 114 (S914).

Subsequently, the discrimination information calculation unit 1141 acquires a discriminator corresponding to the property data from the discriminator information 151 (S915), generates discrimination information based on the discriminator acquired based on the discriminator information and the discrimination-use feature amount input from the discrimination-use feature amount extraction unit 1131, and inputs the generated discrimination information to the synthesized information generation unit 118 (S916).

Subsequently, the reliability estimation unit 1142 acquires a reliability estimator corresponding to the property data from the reliability estimator information 152 (S917), calculates a reliability of the discrimination information generated by the discrimination information calculation unit 1141 based on the acquired reliability feature amount and reliability estimator information on the property data acquired from the reliability estimator information 152, and inputs the calculated reliability to the synthesized information generation unit 118 (S918).

Subsequently, the synthesized information generation unit 118 acquires discriminator weight information corresponding to each piece of the property data from the discriminator weight information 153 (S919), generates synthesized vector information based on the discrimination information input from the discrimination unit 114, the reliability, and the discriminator weight information, and inputs the generated synthesized vector information to the object recognition processing unit 119 (S920).

Subsequently, the object recognition processing unit 119 estimates a class to which the target data belongs based on the synthesized vector information and inputs the estimated result to the recognition result output unit 120 (S921).

Subsequently, the recognition result output unit 120 outputs information indicating the input estimated result to the output device 55 (S922).

Therefore, the object recognition processing S900 is terminated.

As described above, the object recognition apparatus calculates discrimination information for each piece of property data, calculates reliability of the discrimination information for each piece of the property data, and estimates a class to which the property data belongs based on synthesized vector information generated based on the discrimination information and the reliability of the discrimination information, thereby recognizing an object. Therefore, it is possible to accurately recognize the object without averaging feature amounts that are advantageous for the recognition.

Second Embodiment

FIG. 10 is a functional block diagram of the object recognition apparatus 100 described as the second embodiment. The object recognition apparatus 100 according to the second embodiment can be complemented by the same hardware as that of the object recognition apparatus 100 according to the first embodiment. The object recognition apparatus 100 according to the second embodiment has functions equivalent to those of the object recognition apparatus 100 according to the first embodiment.

The object recognition apparatus 100 according to the second embodiment further includes a learning unit 161 in addition to the functions of the object recognition apparatus 100 according to the first embodiment. The information storage unit 110 according to the second embodiment further stores learning-use information 155 in addition to information stored in the object recognition apparatus 100 according to the first embodiment. The object recognition apparatus 100 according to the second embodiment automatically generates the discriminator information 151, the reliability estimator information 152, and the discriminator weight information 153 by machine learning. The learning-use information 155 includes learning-use data used for machine learning. Hereinafter, differences from the first embodiment will be mainly described.

FIG. 11 is a functional block diagram related to the learning unit 161. As shown in the same drawing, the learning unit 161 includes a discriminator construction unit 1611, a discriminator weight information generation unit 1612, a reliability estimator construction unit 1613, and a correctness or incorrectness evaluation unit 1614. The learning unit 161 also stores a correctness or incorrectness attached reliability feature amount 1620. The learning unit 161 acquires a learning-use discrimination-use feature amount and a learning-use reliability feature amount from the learning-use information 155 and performs machine learning using the learning-use discrimination-use feature amount and the learning-use reliability feature amount as learning-use data, thereby generating the discriminator information 151, the reliability estimator information 152, and the discriminator weight information 153.

FIG. 12 shows an example of the learning-use information 155. As shown in the same drawing, the learning-use information 155 includes one or more records each including items of a learning-use data ID 1551, a property ID 1552, a reliability feature amount 1553, a discrimination-use feature quantity 1554, and a class ID 1555. One record of the learning-use information 155 corresponds to one piece of learning data.

Among the above items, an identifier (hereinafter, referred to as a learning-use data ID) assigned to each piece of the learning-use data is set in the learning-use data ID 1551. A property ID is set in the property ID 1552. A learning-use reliability feature amount is set in the reliability feature amount 1553. A learning-use discrimination-use feature amount is set in the discrimination-use feature quantity 1554. A class ID is set in the class ID 1555.

Returning to FIG. 11, the discriminator construction unit 1611 learns a discriminator based on the learning-use data stored as the learning-use information 155 and stores the learned discriminator as the discriminator information 151. The discriminator construction unit 1611 learns, for example, a process when a pattern is found for the learning-use discrimination-use feature amount as a discriminator. For example, when an SVM is used as a discriminator, the discriminator construction unit 1611 learns a discriminator by searching for a parameter of a discriminant that determines a plane in which a feature amount of each class can be most separated in a feature amount space.

As shown in FIG. 11, the discrimination information calculation unit 1141 of the discrimination unit 114 acquires a discriminator from the discriminator information 151 and generates discrimination information based on the acquired discriminator and the learning-use data acquired from the learning-use information 155. The discrimination information calculation unit 1141 generates information (hereinafter, referred to as learning-use discrimination information) acquired by attaching the class ID 1555 of the learning-use data input to the discriminator to the generated discrimination information, and inputs the generated learning-use discrimination information to the correctness or incorrectness evaluation unit 1614 of the learning unit 161.

The correctness or incorrectness evaluation unit 1614 estimates a class of the learning-use discrimination information based on the learning-use discrimination information input from the discrimination information calculation unit 1141. For example, when a probability, likelihood or the like that indicates a class of target data and a belonging degree of the class is expressed by the discrimination information as vector information, the correctness or incorrectness evaluation unit 1614 estimates a class having maximum likelihood as the class of the learning-use discrimination information.

Subsequently, the correctness or incorrectness evaluation unit 1614 compares the estimated class with a class attached to the learning-use discrimination information, thereby evaluating correctness or incorrectness of the estimated class and storing an evaluation result thereof as the correctness or incorrectness attached reliability feature amount 1620.

FIG. 13 shows an example of the correctness or incorrectness attached reliability feature amount 1620. As shown in the same drawing, the correctness or incorrectness attached reliability feature amount 1620 includes one or more records each including items of a property ID 1621, a reliability feature amount 1622, and correctness or incorrectness evaluation 1623.

Among the above items, the property ID 1552 of the learning-use data is set in the property ID 1621. The reliability feature amount 1553 of the learning-use data is set in the reliability feature amount 1622. The evaluation result of correctness or incorrectness (hereinafter, referred to as correctness or incorrectness evaluation) is set in the correctness or incorrectness evaluation 1623.

Referring back to FIG. 11, when the estimated class matches the class attached to the learning-use discrimination information, the correctness or incorrectness evaluation unit 1614 stores a record, which is acquired by attaching "correct" as correctness or incorrectness evaluation to a combination of the property ID 1552 and the reliability feature amount 1553 of the learning-use data, in the correctness or incorrectness attached reliability feature amount 1620. When the estimated class does not match the class attached to the learning-use discrimination information, the correctness or incorrectness evaluation unit 1614 stores a record, which is acquired by attaching "incorrect" as correctness or incorrectness evaluation to the combination of the property ID 1552 and the reliability feature amount 1553 of the learning-use data, in the correctness or incorrectness attached reliability feature amount 1620.

For example, the discriminator weight information generation unit 1612 calculates a correct answer rate for each property (each property ID) based on contents of the correctness or incorrectness evaluation 1623 of the correctness or incorrectness attached reliability feature amount 1620, stores the calculated correct answer rate as the discriminator weight 1532, and stores information (records) corresponding to the property ID 1531 as the discriminator weight information 153.

The reliability estimator construction unit 1613 includes a correct discrimination reliability estimator construction unit 171, an incorrect discrimination reliability estimator construction unit 172, and an evaluation value calculation unit 173.

The correct discrimination reliability estimator construction unit 171 learns a correct discrimination reliability estimator based on the reliability feature amount 1622 (the learning-use data) in which "correct" is set in the correctness or incorrectness evaluation 1623 from the correctness or incorrectness attached reliability feature amount 1620, and stores a learning result as the reliability estimator information 152.

The incorrect discrimination reliability estimator construction unit 172 learns an incorrect discrimination reliability estimator based on the reliability feature amount 1622 (the learning-use data) in which "incorrect" is set in the correctness or incorrectness evaluation 1623 from the correctness or incorrectness attached reliability feature amount 1620, and stores a learning result as the reliability estimator information 152.

The reliability estimator construction unit 1613, for example, clusters correct reliability feature amounts and incorrect reliability feature amounts in the feature amount space and searches for a parameter of a probability model representing a probability distribution of likelihood information of the correct reliability feature amounts and the incorrect reliability feature amounts in the feature amount space, thereby learning the correct discrimination reliability estimator and the incorrect discrimination reliability estimator. The correct discrimination reliability estimator is a probability model representing a probability distribution of the "correct" reliability feature amounts. The incorrect discrimination reliability estimator is a probability model representing a probability distribution of the "incorrect" reliability feature amounts.

The evaluation value calculation unit 173 calculates prior probability of reliability of a discriminator from, for example, a ratio (a correctness or incorrectness rate of discrimination information of the discriminator) of "correct" to "incorrect" of the correctness or incorrectness evaluation 1623 in the records of the correctness or incorrectness attached reliability feature amount 1620. The evaluation value calculation unit 173 outputs the calculated ratio as an evaluation value of the discriminator and stores the calculated ratio as the discriminator evaluation value 1524 of the reliability estimator information 152.

FIG. 14 is a flowchart showing processing (hereinafter, referred to as learning processing S1400) performed by the object recognition apparatus 100 according to the second embodiment in learning the discriminator information 151, the reliability estimator information 152, and the discriminator weight information 153. The learning processing S1400 will be described below with FIG. 14.

It is assumed that the learning-use information 155 is prepared on assumption that the learning processing S1400 to be described below is executed. Contents of the learning-use information 155 are generated by, for example, inputting property data generated by the heterogeneous property data generation unit 112 based on learning-use target data to the feature amount extraction unit 113 (the discrimination-use feature amount extraction unit 1131 and the reliability feature amount extraction unit 1132).

As shown in FIG. 14, first, the discriminator construction unit 1611 of the learning unit 161 learns a discriminator based on learning data stored as the learning-use information 155 (S1411).

Subsequently, the discrimination information calculation unit 1141 of the discrimination unit 114 acquires a discriminator from the discriminator information 151 and generates learning-use discrimination information based on the acquired discriminator and learning-use data acquired from the learning-use information 155 (S1412).

Subsequently, based on the learning-use discrimination information input from the discrimination information calculation unit 1141, the correctness or incorrectness evaluation unit 1614 estimates a class of the learning-use data used to generate the learning-use discrimination information (S1413).

Subsequently, the correctness or incorrectness evaluation unit 1614 compares the estimated class with a class attached to the learning-use determination information, thereby evaluating correctness or incorrectness of the estimated class and storing an evaluation result as the correctness or incorrectness attached reliability feature amount 1620 (S1414).

Subsequently, the discriminator weight information generation unit 1612 calculates a correct answer rate for each property (each property ID) based on contents of the correctness or incorrectness evaluation 1623 of the correctness or incorrectness attached reliability feature amount 1620, stores the calculated correct answer rate as the discriminator weight 1532, and stores information (records) corresponding to the property ID 1531 as the discriminator weight information 153 (S1415).

Subsequently, the reliability estimator construction unit 1613 learns a reliability estimator (a correct discrimination reliability estimator and an incorrect discrimination reliability estimator), calculates an evaluation value of the discriminator, and stores the learned contents as the reliability estimator information 152 (S1416).

As described above, since the object recognition apparatus 100 according to the second embodiment automatically generates the discriminator information 151, the reliability estimator information 152, and the discriminator weight information 153 by machine learning, the discriminator information 151, the reliability estimator information 152, and the discriminator weight information 153 can be efficiently constructed. Since the discriminator information 151, the reliability estimator information 152, and the discriminator weight information 153 are constructed by machine learning based on the learning-use data prepared for each property, the object recognition apparatus 100 with high recognition accuracy can be constructed. The object recognition apparatus 100, for example, generates the discriminator information 151, the reliability estimator information 152, and the discriminator weight information 153 based on target data acquired from an object not recognized in the past, so that various objects can be recognized with high accuracy.

Third Embodiment

The third embodiment relates to specific examples of the target data acquisition unit 111 and the heterogeneous property data generation unit 112 of the object recognition apparatus 100 in the first or second embodiment.

The target data acquisition unit 111 of the object recognition apparatus 100 according to the third embodiment acquires data (RAW data, energy data) in a vector format representing transmission intensity of X-rays output from an X-ray photographing apparatus as target data.

FIG. 15 is a functional block diagram related to the heterogeneous property data generation unit 112 of the object recognition apparatus 100 according to the third embodiment. As shown in the same drawing, the heterogeneous property data generation unit 112 includes a scaling processing unit 1121, an RGB conversion processing unit 1122, and a Hue Saturation Value (HSV) conversion processing unit 1123.

The scaling processing unit 1121 generates property A data based on the target data input from the target data acquisition unit 111 and inputs the generated property A data to the feature amount extraction unit 113A. The RGB conversion processing unit 1122 generates property B data based on the target data and inputs the generated property B data to the feature amount extraction unit 113B. The HSV conversion processing unit 1123 generates property C data based on the target data and inputs the generated property C data to a feature amount extraction unit 113C. In this manner, it is assumed that the object recognition apparatus 100 includes three or more pairs of the feature amount extraction unit 113 and the discrimination unit 114 in the third embodiment.

FIG. 16 shows an example of target data 31 (RAW data) and scaling information 32 generated based on the target data 31. The scaling processing unit 1121 generates information (hereinafter, referred to as scaling information 32) acquired by scaling each component (information indicating energy intensity) of the target data in a range of 0 to 255, generates grayscale image data using the generated scaling information 32, and inputs the generated grayscale image data to the feature amount extraction unit 113A as the property A data.

FIG. 17 shows an example of an RGB conversion table 1700 referred to by the RGB conversion processing unit 1122. The RGB conversion processing unit 1122 converts each component into information on an RGB space (hereinafter referred to as RGB space information) in accordance with a value of each component of the target data 31 and inputs the RGB space information, that is, the color image data to the feature amount extraction unit 113B as the property B data.

The HSV conversion processing unit 1123 converts each component into information (hereinafter, referred to as HSV space information) on an HSV space (a hue space H, a saturation space S, and a brightness space V) in accordance with the value of each component of the target data 31 and inputs the HSV space information (image data of the HSV space) to the feature amount extraction unit 113C as the property C data.

FIG. 18 shows a state of conversion performed by the HSV conversion processing unit 1123. As shown in the same drawing, the above conversion for the hue space H is performed using, for example, a hue space conversion destination reference table 1811 prepared in advance. The above conversion for the saturation space S is performed by, for example, scaling processing (saturation space conversion processing) of values of components of the target data 31 in a range of 0 to 1. The above conversion for the brightness space V is performed by, for example, processing (brightness space conversion processing) of setting 0 when the value of each component of the target data 31 is close to (within a predetermined range from 0) 0 and setting 1 otherwise.

In this way, when the target data is in a vector format and represents the transmission intensity of X-rays, it is possible to generate a plurality of types of property data reflecting different properties of an object by the above method and to complement a mechanism that recognizes the object based on an X-ray image with high accuracy.

In the present embodiment, the same target data is input to the scaling processing unit 1121, the RGB conversion processing unit 1122, and the HSV conversion processing unit 1123. However, different target data may be input thereto.

Fourth Embodiment

The fourth embodiment relates to an example of a system (hereinafter, referred to as an object recognition system 1) that is configured based on components included in the object recognition apparatus 100 of the first to third embodiments and that recognizes an object based on an X-ray photographed image.

FIG. 19 is a functional block diagram of the object recognition system 1. As shown in the same drawing, the object recognition system 1 includes an X-ray photographing apparatus 60, a photographed image storage apparatus 61, an object recognition apparatus 100, an object recognition apparatus setting terminal 200, a learning apparatus 300, a learning apparatus setting terminal 400, and an image inspection apparatus 500.

The photographed image storage device 61, the object recognition device 100, the object recognition apparatus setting terminal 200, the learning apparatus 300, the learning apparatus setting terminal 400, and the image inspection apparatus 500 are complemented using, for example, an information processing apparatus having the same configuration as that of the hardware shown in FIG. 2. Functions of these apparatuses are complemented by, for example, reading and executing programs stored in a main storage device or an auxiliary storage device by a processor of the information processing apparatus. The functions of these apparatuses are complemented by, for example, hardware of the information processing apparatus. All or a part of the functions of these apparatuses may be complemented by, for example, virtual resources such as a cloud server in a cloud system.

As shown in FIG. 19, the X-ray photographing apparatus 60 and the photographed image storage apparatus 61 are communicably connected with each other. The X-ray photographing apparatus 60 outputs data (RAW data, energy data) in a vector format representing transmission intensity of X-rays as target data. The photographed image storage apparatus 61 stores the data output by the X-ray photographing apparatus 60.

The object recognition apparatus 100 is communicably connected to the X-ray photographing apparatus 60, the photographed image storage apparatus 61, and the learning apparatus 300 via a first communication network 51. The object recognition apparatus 100 is communicably connected to the object recognition apparatus setting terminal 200 via a second communication network 52. The object recognition apparatus 100 is communicably connected to the image inspection apparatus 500 via a third communication network 53. The learning apparatus 300 is communicably connected to the learning apparatus setting terminal 400 via a fourth communication network 54.

The first to fourth communication networks 51 to 54 are, for example, wired or wireless communication networks and are complemented using a predetermined communication method such as a Local Area Network (LAN), a wireless LAN, a Universal Serial Bus (USB), serial communication, or parallel communication.

The X-ray photographing apparatus 60 and the photographed image storage apparatus 61 provide target data (image data and video data) to the object recognition apparatus 100 and the learning apparatus 300 via the first communication network 51.

The object recognition apparatus 100 has the same configuration as that of the object recognition apparatus 100 according to at least one of the first to third embodiments. A recognition result from the object recognition processing unit 119 is provided to the image inspection apparatus 500 via the third communication network 53. Omission is made in FIG. 19, and accordingly only one combination of the feature amount extraction unit 113 and the discrimination unit 114 is shown. It should be noted that the object recognition apparatus 100 according to the fourth embodiment also includes a plurality of combinations of the feature amount extraction unit 113 and the discrimination unit 114.

The object recognition apparatus setting terminal 200 includes a discriminator weight information setting unit 211 and a recognition-use threshold information setting unit 212. The discriminator weight information setting unit 211 provides a user interface for setting of the discriminator weight information 153. The recognition-use threshold information setting unit 212 provides a user interface for setting of various types of setting information such as a threshold used when the object recognition processing unit 119 estimates a class to which the target data belongs.

The learning apparatus 300 includes the heterogeneous property data generation unit 112, a generated image storage unit 311, the discrimination-use feature amount extraction unit 1131, the reliability feature amount extraction unit 1132, the discriminator construction unit 1611, the reliability estimator construction unit 1613, and a learned information storage unit 312. Among them, the heterogeneous property data generation unit 112, the discrimination-use feature amount extraction unit 1131, the reliability feature amount extraction unit 1132, the discriminator construction unit 1611, and the reliability estimator construction unit 1613 are the same as those in the second embodiment, and descriptions thereof will be omitted.

The generated image storage unit 311 stores property data generated by the heterogeneous property data generation unit 112. The learned information storage unit 312 stores the discriminator information 151, the reliability estimator information 152, and the discriminator weight information 153 that are generated by the learning unit 161. These pieces of information stored in the learned information storage unit 312 are provided to the object recognition apparatus 100 at any time via the first communication network 51. The object recognition apparatus 100 uses the provided information as its own discriminator information 151, reliability estimator information 152, and discriminator weight information 153.

The learning apparatus setting terminal 400 includes a class setting unit 411. The class setting unit 411 provides a user interface (a user interface for setting of the class ID 1555 of the learning-use information 155) that assigns a class to an object included in the property data stored in the generated image storage unit 311.

The image inspection apparatus 500 includes the recognition result output unit 120. The recognition result output unit 120 is the same as that of the first embodiment, and a description thereof will be omitted.

FIG. 20 shows an example of a screen (hereinafter, referred to as a recognition result display screen 2000) output by the recognition result output unit 120 as a recognition result. As shown in the same drawing, the recognition result display screen 2000 includes a property data image display region 2011, a property data reliability display region 2012, a class belonging degree display region 2013, and a estimation result display region 2014.

An image based on a plurality of pieces of property data generated by the heterogeneous property data generation unit 112 based on the target data (X-ray photographed image data of an object S (X-ray energy data) is displayed in the property data image display region 2011. In this example, the image is displayed based on the property A data, the property B data, and the property C data. A user can grasp the image of the property data from contents of the display region 2011.

Reliability estimated by the reliability estimation unit 1142 of the discrimination unit 114 for the property data is displayed in the property data reliability display area 2012. An image of property data having a highest reliability is highlighted (displayed with a thick line in this example) in the property data image display region 2011. An image of the property B data (reliability=0.8442) having the highest reliability is highlighted in this example. The user can grasp reliability of the discrimination information based on the property data from contents of the display region 2012.

A class belonging degree calculated by the object recognition processing unit 119 when estimating a class to which the target data belongs based on synthesized vector information is displayed in the class belonging degree display region 2013. The user can grasp a state of the class belonging degree of the target data from contents of the display region 2013.

An estimation result from the object recognition processing unit 119 is displayed in the estimation result display region 2014. In this example, "2" (the belonging degree=0.8) is a class ID having a highest belonging degree and is displayed as the estimation result. The user can grasp the recognition result from contents of the display region 2014.

With the configuration described above, the X-ray photographing apparatus 60 and the object recognition apparatus 100 can cooperate with each other. Processing related to the object recognition can be efficiently performed on data acquired by the X-ray photographing apparatus 60. The learning apparatus 300 continuously learns the data acquired and accumulated from the X-ray photographing apparatus 60 as learning data and provides the learned data to the object recognition apparatus 100, whereby a system that recognizes an object with high accuracy can be complemented.

The first to fourth embodiments have been described in detail above. However, the invention is not limited to the above embodiments, and various modifications can be made without departing from the gist of the invention. For example, the embodiments described above have been described in detail for easy understanding of the invention, and the invention is not necessarily limited to those including all the configurations described above. Other configurations can be added to, eliminated from, or replaced with a part of the configuration of the above-described embodiments.

A plurality of types of property data is generated based on one type of target data in the above embodiments; however, the plurality of types of property data may be generated based on, for example, a plurality of pieces of target data. When the plurality of types of property data are generated based on the plurality of pieces of target data, for example, it is assumed that the target data includes a plurality of pieces of image data acquired by photographing an object to be recognized from different directions, or that the target data includes a plurality of pieces of image data acquired by photographing different parts of the object to be recognized.

Some or all of the above-described configurations, functional units, processing units, processing methods, and the like may be complemented by hardware, for example, by designing with an integrated circuit. The above-described configurations, functions, and the like may be complemented by software by interpreting and executing programs that complement the respective functions by a processor. Information such as a program, a table, and a file that complements each function can be stored in a recording device such as a memory, a hard disk, a Solid State Drive (SSD), or in a recording medium such as an IC card, an SD card, or a DVD.

In the drawings, control lines and information lines indicate what is considered necessary for explanation, and not all control lines and information lines in the products are shown. For example, it may be considered that almost all the configurations are actually connected to each other.

Arrangement forms of various functional units, various processing units, and various databases of the various apparatuses described above are merely examples, and can be changed to an optimum arrangement form from viewpoints of performance, processing efficiency, communication efficiency, and the like of hardware and software that are included in the various apparatuses.

A configuration (Schema) of the database can be flexibly changed from viewpoints of efficient utilization of resources, improvement of processing efficiency, improvement of access efficiency, improvement of search efficiency, and the like.

REFERENCE SIGN LIST 1 object recognition system
100 object recognition apparatus
111 target data acquisition unit
112 heterogeneous property data generation unit
113 feature amount extraction unit
1131 discrimination-use feature amount extraction unit
1132 reliability feature amount extraction unit
114 discrimination unit
1141 discrimination information calculation unit
1142 reliability estimation unit
118 synthesized information generation unit
119 object recognition processing unit
120 recognition result output unit
151 discriminator information
152 reliability estimator information
153 discriminator weight information
155 learning-use information
161 learning unit
1611 discriminator construction unit
1612 discriminator weight information generation unit
1613 reliability estimator construction unit
1614 correctness or incorrectness evaluation unit
1620 correctness or incorrectness attached reliability feature amount
171 correct discrimination reliability estimator construction unit
172 incorrect discrimination reliability estimator construction unit
173 evaluation value calculation unit
611 correct discrimination likelihood value calculation unit
612 incorrect discrimination likelihood value calculation unit
620 reliability calculation unit
S900 object recognition processing
S1400 learning processing
2000 recognition result display screen

The invention claimed is:

1. An object recognition apparatus comprising:
   a heterogeneous property data generation unit that generates, for a plurality of different properties, property data which highlights a specific property based on target data acquired for an object;
   a discrimination-use feature amount extraction unit that extracts, for each piece of the property data, a discrimination-use feature amount used for discrimination of each piece of the property data;
   a discrimination information calculation unit that calculates, for each piece of the property data, discrimination information used for discrimination of the property data based on the discrimination-use feature amount calculated for each piece of the property data;
   a reliability feature amount extraction unit that extracts, for each piece of the property data, a reliability feature amount used for estimation of reliability of the discrimination information calculated for each piece of the property data;
   a reliability estimation unit that estimates, for each piece of the property data, the reliability of the discrimination information based on the reliability feature amount calculated for each piece of the property data;
   a synthesized information generation unit that generates synthesized information acquired by synthesizing the discrimination information calculated for each piece of the property data and the reliability calculated for each piece of the property data; and
   an object recognition processing unit that performs processing related to recognition of the object based on the synthesized information and generates a recognition result.

2. The object recognition apparatus according to claim 1, further comprising:
   an information storage unit that stores discriminator information for construction of a discriminator prepared for each piece of the property data, wherein
   the discrimination information calculation unit calculates the discrimination information on the property data based on the discrimination-use feature amount of the property data and the discriminator prepared for the property data.

3. The object recognition apparatus according to claim 2, further comprising:
   an information storage unit that stores reliability estimator information for construction of a correct discrimination reliability estimator and an incorrect discrimination reliability estimator which are prepared for each piece of the property data, wherein
   the reliability estimation unit includes:
      a correct discrimination likelihood value calculation unit that calculates a correct discrimination likelihood value based on the reliability feature amount of the property data and the correct discrimination reliability estimator of the property data;
      an incorrect discrimination likelihood value calculation unit that calculates an incorrect discrimination likelihood value based on the reliability feature amount of the property data and the incorrect discrimination reliability estimator of the property data; and
      a reliability calculation unit that calculates the reliability based on the correct discrimination likelihood value and the incorrect discrimination likelihood value.

4. The object recognition apparatus according to claim 3, wherein
   the information storage unit stores an evaluation value of the discriminator, and
   the reliability calculation unit calculates the reliability based on the correct discrimination likelihood value, the incorrect discrimination likelihood value, and the evaluation value.

5. The object recognition apparatus according to claim 4, wherein
   the information storage unit stores discriminator weight information on a weight of each of the discriminator, and
   the synthesized information generation unit generates synthesized vector information based on the discrimination information, the reliability, and the weight of the discriminator as the synthesized information.

6. The object recognition apparatus according to claim 5, wherein
   the object recognition processing unit generates a class estimated based on the synthesized vector information as the recognition result.

7. The object recognition apparatus according to claim 6, further comprising:

an information storage unit that stores a correspondence between learning-use discrimination-use feature amount and the class as learning-use information; and
a discriminator construction unit that generates the discriminator information based on the learning-use discrimination-use feature amount.

8. The object recognition apparatus according to claim 6, further comprising:
an correctness or incorrectness evaluation unit that generates a correctness or incorrectness attached reliability feature amount by estimating a class based on learning-use discrimination information and comparing the estimated class with a class corresponding to the learning-use discrimination-use feature amount, the correctness or incorrectness attached reliability feature amount being information including a result of correctness or incorrectness evaluation for each piece of the property data; and
a discriminator weight information generation unit that generates the discriminator weight information based on a ratio of correctness to incorrectness grasped from the correctness or incorrectness attached reliability feature amount, wherein
the information storage unit stores a correspondence among the learning-use discrimination-use feature amount, learning-use reliability feature amount, and the class as learning-use information, and
the discrimination information calculation unit generates the learning-use discrimination information based on the learning-use discrimination-use feature amount.

9. The object recognition apparatus according to claim 8, further comprising:
an reliability estimator construction unit that includes a correct discrimination reliability estimator construction unit which constructs the correct discrimination reliability estimator based on the correctness or incorrectness attached reliability feature amount, an incorrect discrimination reliability estimator construction unit which constructs the incorrect discrimination reliability estimator based on the correctness or incorrectness attached reliability feature amount, and an evaluation value calculation unit which calculates the evaluation value based on the correctness or incorrectness attached reliability feature amount, and that generates the reliability estimator information based on the correct discrimination reliability estimator, the incorrect discrimination reliability estimator and the evaluation value.

10. The object recognition apparatus according to claim 7, further comprising:
a class setting unit that provides a user interface which sets the learning-use information.

11. The object recognition apparatus according to claim 1, wherein
the target data is image data in a Red Green Blue (RGB) format acquired by photographing the object with a photographing apparatus, and
the heterogeneous property data generation unit generates at least two of data acquired by extracting an R component from the image data, data acquired by extracting a G component from the image data, and data acquired by extracting a B component from the image data as a plurality of pieces of property data.

12. The object recognition apparatus according to claim 1, wherein
the target data is X-ray image data acquired by photographing the object with an X-ray photographing apparatus, and the heterogeneous property data generation unit is configured to
generate a grayscale image having a pixel value acquired by scaling an X-ray intensity value in the X-ray image data as first property data,
generate image data in a Red Green Blue (RGB) format converted from the X-ray image data in accordance with a range of the X-ray intensity value in the X-ray image data as second property data, and
generate image data in a Hue Saturation Value (HSV) format converted from the X-ray image data in accordance with the range of the X-ray intensity value in the X-ray image data as third property data.

13. An object recognition system that includes the object recognition apparatus according to claim 6, the object recognition system comprising:
a learning apparatus communicably connected to the object recognition apparatus, wherein
the learning apparatus includes:
an information storage unit that storages a correspondence among learning-use discrimination-use feature amount, learning-use reliability feature amount, and the class as learning-use information;
a discriminator construction unit that generates the discriminator information based on the learning-use discrimination-use feature amount;
an correctness or incorrectness evaluation unit that generates a correctness or incorrectness attached reliability feature amount by (i) estimating a class based on learning-use discrimination information generated by the discrimination information calculation unit based on the learning-use discrimination-use feature amount and (ii) comparing the estimated class with a class corresponding to the learning-use discrimination-use feature amount, the correctness or incorrectness attached reliability feature amount being information including a result of correctness or incorrectness evaluation for each piece of the property data;
a discriminator weight information generation unit that generates the discriminator weight information based on a ratio of correctness to incorrectness grasped from the correctness or incorrectness attached reliability feature amount; and
an reliability estimator construction unit that includes a correct discrimination reliability estimator construction unit which constructs the correct discrimination reliability estimator based on the correctness or incorrectness attached reliability feature amount, an incorrect discrimination reliability estimator construction unit which constructs the incorrect discrimination reliability estimator based on the correctness or incorrectness attached reliability feature amount, and an evaluation value calculation unit which calculates the evaluation value based on the correctness or incorrectness attached reliability feature amount, and that generates the reliability estimator information based on the correct discrimination reliability estimator, the incorrect discrimination reliability estimator and the evaluation value.

14. An object recognition method comprising:
generating for a plurality of different properties, by an information processing apparatus, property data that highlights a specific property based on target data acquired for an object;

extracting for each piece of the property data, by the information processing apparatus, a discrimination-use feature amount used for discrimination of each piece of the property data;

calculating for each piece of the property data, by the information processing apparatus, discrimination information used for discrimination of the property data based on the discrimination-use feature amount calculated for each piece of the property data;

extracting for each piece of the property data, by the information processing apparatus, a reliability feature amount used for estimation of reliability of the discrimination information calculated for each piece of the property data;

estimating for each piece of the property data, by the information processing apparatus, the reliability of the discrimination information based on the reliability feature amount calculated for each piece of the property data;

generating, by the information processing apparatus, synthesized information acquired by synthesizing the discrimination information calculated for each piece of the property data and the reliability calculated for each piece of the property data; and performing, by the information processing apparatus, processing related to recognition of the object based on the synthesized information and generating a recognition result.

15. The object recognition method according to claim 14, further comprising:

storing, by the information processing apparatus, a correspondence among learning-use discrimination-use feature amount, learning-use reliability feature amount, and a class as learning-use information;

generating, by the information processing apparatus, the discriminator information based on the learning-use discrimination-use feature amount;

generating, by the information processing apparatus, learning-use discriminator information based on the learning-use discrimination-use feature amount;

an correctness or incorrectness evaluation unit that generates a correctness or incorrectness attached reliability feature amount by estimating a class based on the learning-use discrimination information and comparing the estimated class with a class corresponding to the learning-use discrimination-use feature amount, the correctness or incorrectness attached reliability feature amount being information including a result of correctness or incorrectness evaluation for each piece of the property data; and generating, by the information processing apparatus, the discriminator weight information based on a ratio of correctness to incorrectness grasped from the correctness or incorrectness attached reliability feature amount.

* * * * *